United States Patent [19]

Soechtig et al.

[11] Patent Number: 4,643,581

[45] Date of Patent: Feb. 17, 1987

[54] PISTON METERING APPARATUS OF A REACTION INJECTION MOLDING MACHINE

[75] Inventors: Wolfgang Soechtig, Germering; Peter Wagner, Weichs; Karl-Ludwig Korzeczek, Munich, all of Fed. Rep. of Germany

[73] Assignee: Krauss-Maffei, A.G., Munich, Fed. Rep. of Germany

[21] Appl. No.: 655,556

[22] Filed: Sep. 28, 1984

[30] Foreign Application Priority Data

Oct. 4, 1983 [DE] Fed. Rep. of Germany ....... 3336036

[51] Int. Cl.$^4$ .............................................. B28C 7/04
[52] U.S. Cl. ........................................ 366/76; 92/168; 222/372; 222/146.5; 277/125
[58] Field of Search .................... 264/328.6; 425/543; 222/372, 146.5; 417/519; 92/128, 168; 277/29, 123-125; 366/69, 36, 131, 136, 137, 150, 152, 159, 160, 161, 190, 332, 333, 241

[56] References Cited

U.S. PATENT DOCUMENTS

| | | | |
|---|---|---|---|
| 2,610,613 | 9/1952 | Bryant | 92/168 |
| 3,132,568 | 5/1964 | Strader | 92/168 |
| 3,419,280 | 12/1968 | Wheeler | 277/123 |
| 3,901,408 | 8/1975 | Boden et al. | |
| 3,989,258 | 11/1976 | Kunderman | 277/29 |
| 4,258,612 | 3/1981 | Kuhlmann | 92/128 |
| 4,319,517 | 3/1982 | McCaleb | 92/128 |

FOREIGN PATENT DOCUMENTS

| | | |
|---|---|---|
| 2339384 | 7/1972 | Fed. Rep. of Germany . |
| 7225549 | 9/1972 | Fed. Rep. of Germany . |
| 352998 | 10/1979 | Fed. Rep. of Germany . |

OTHER PUBLICATIONS

"Polyurethane-Filler Metering Technology Employing the KM-Poston Mettering Unit" Krauss-Maffei A.G., 1st Ed., 6/7/83.

Primary Examiner—Robert W. Jenkins
Attorney, Agent, or Firm—Robert J. Koch

[57] ABSTRACT

A piston metering apparatus for the metering of the components of a reaction injection molding machine comprising a metering cylinder (2) the cylinder space of which is surrounded by a cylinder wall, a metering piston (10) sealed in relation to the cylinder wall by means of a sealing unit, a cylinder base (3), component inlet (4) and component outlet lines (5) connected with the metering cylinder (2), and a metering piston (10) coupled with the hydraulic piston rod of a hydraulic drive unit (12). In order to simplify the inspection and maintenance of such a piston metering apparatus, the metering piston (10) is in the form of a plunger piston and the sealing unit is contained in a sealing cartridge (9) releasably fastened to the upper edge of the metering cylinder (2).

15 Claims, 8 Drawing Figures

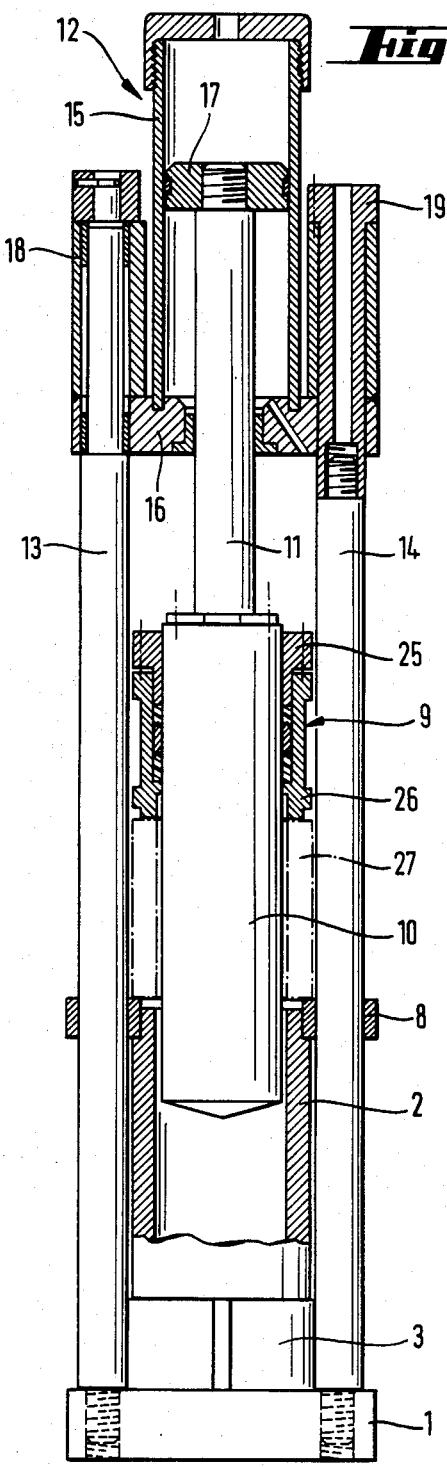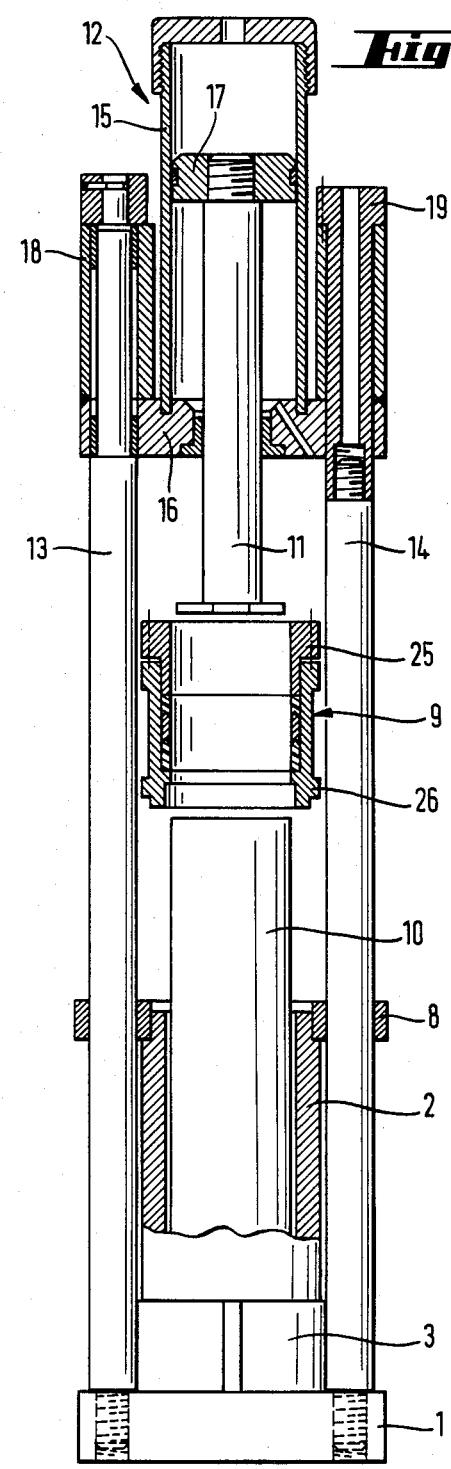

PISTON METERING APPARATUS OF A REACTION INJECTION MOLDING MACHINE

BACKGROUND OF INVENTION

The invention relates to a metering apparatus of a reaction molding machine, more particuarly to an apparatus for metering components such as reactant and or filler material components for use in a reaction injection molding machine.

A metering apparatus of this type is known from the prospectus "Polyurethane-Filler Metering Technology . . . " of June, 1978 of the Krauss-Maffei AG (figures on pages 2 and 4). In this metering apparatus, the cylinder walls of the metering cylinder and the cylinder walls of the hydraulic drive means to drive the metering piston are joined together in a single piece. The metering piston comprises a sealing unit and the devices for the retightening of the packing, which are accessible through orifices in the cylinder walls of the metering cylinder.

This metering apparatus has the disadvantage that when the metering piston is dismantled for maintenance, replacement of the sealing unit, and inspection of the inner walls of the cylinder, it is also necessary to remove the hydraulic drive unit from the one-piece cylinder. The piston of the hydraulic drive unit, which is joined to the metering piston, is a long and massive structural component which requires a crane for its removal. A metering apparatus of this type also has a considerable structural height, so that a correspondingly high space must be provided above the metering apparatus for its disassembly. Inspecting the metering cylinder is rather difficult, because it is accessible only through the orifice in the hydraulic drive unit.

Piston metering devices are already known in which two hydraulic cylinders of a hydraulic drive unit are provided in addition to the metering cylinder. Such a unit has a reduced structural height, but represents a more expensive construction because the metering piston must be connected by means of a yoke with the two hydraulic pistons of the hydraulic drive unit.

SUMMARY OF THE INVENTION

It is an object of the invention to simplify the maintenance and inspection of a piston metering apparatus of the above-mentioned type and to improve the functional capability of the sealing unit.

This object is achieved by the piston metering device according to the invention. This yields the advantage that material reacting in the cylinder space of the metering cylinder, such as, for example, material that may be deposited in the processing of nylon as the result of excess temperatures or aging, is easily removed because of the substantially improved accessibility of the cylinder space. A further advantage is obtained with regard to the life of the seal and the susceptibility to wear of the metering piston and the metering cylinder. Actual practice has shown that sealing units mounted immobily in the cylinder are more stable and subject the moving surface to less wear than seals arranged on a moving piston.

The sealing cartridge is especially appropriate for arranging means for tightening and/or for regulating the tightness of the sealing packs. The sealing packs may be inspected and tightened in any operating state, i.e. independent of the position of the piston and even during operation of the piston.

In a preferred embodiment of the invention, the sealing cartridge comprises means to expose the seal to flushing and/or sealing media. Such media are supplied in a particularly simple manner through a supply line attached to the outer wall of the sealing cartridge.

In order to facilitate dismantling, the metering piston is fastened releasably to the rod of the hydraulic piston. In one advantageous embodiment the sealing cartridge may be separated from the metering piston and the metering piston may be removed laterally following its release from the rod of the hydraulic piston. These features allow the piston metering apparatus to have a structural height lower than the known configurations, in which the sealing unit is arranged on the metering piston by at least the height of the sealing cartridge.

A further improvement in detachability is provided by an arrangement of the tie rods whereby the hydraulic drive unit is connected to the metering cylinder, by way of one tie rod fastened in a pivot bearing and the other tie rod fastened to the hydraulic drive unit by means of releasable screw connections. The drive unit may therefore be pivoted from the metering cylinder together with the metering piston and the released sealing cartridge if desired so that the inner cylindrical space of the metering unit is readily accessible for inspection and maintenance work.

In another preferred embodiment of the invention, a two-position reversing valve is provided at the base of the cylinder, at the intersection of a component inlet line, a component outlet line and a connecting line leading to the cylinder space of the metering cylinder. The component inlet line is connected to a reservoir and the component outlet line is connected to the mixing head of a reaction-injection molding (RIM) machine. In one valve position, the cylindrical inner space is connected with the component inlet line; and, in the other position, the component outlet line is connected with the mixing head of the RIM machine.

In the assemblies used until now, the component inlet lines and component outlet lines either each had a forcibly controlled switching valve on the outside of the cylinder base or a check valve there. The present embodiment has the advantage, aside from the fact that only one reversing valve is required, of providing favorable flow conditions. There are no dead spaces in which filler material from the filler laden components may be deposited, and thus create the danger that it may be entrained in the form of hardened clots, leading to the clogging of the piston metering apparatus. Because the reversing valve is located in the bottom of the metering cylinder, a separate heating means normally required for switching valves arranged outside the metering cylinder, in the case of the processing of materials requiring high temperatures, may be eliminated.

In an advantageous manner, a component recirculation or return line, leading from the mixer head is located at the base of the cylinder, which preferably leads into the component inlet line at an acute angle, against the direction of flow of the inlet line. This arrangement is especially advantageous in the processing of filler-laden components, because the volume of the component flowing in the reverse direction counteracts the deposition of filler components in the intermittently-closed component inlet line. A further advantage may be found in particular in the case of components being processed at elevated temperatures, as recycling into the cylinder bottom may be effected in a simpler manner than return the components into the reservoir would require. Connections with a reservoir of this type are relatively expensive in view of the heating and insulating jacket required.

Further objects, features and advantages of the present invention will become apparent in view of the drawings and from the detailed description of preferred embodiments which follows.

BRIEF DESCRIPTION OF THE DRAWINGS

In the drawings:

FIG. 2 shows a piston metering apparatus according to FIG. 1 with a sealing cartridge separated from the metering cylinder and a partially retracted metering piston, FIG. 3 shows a piston metering apparatus with a released sealing cartridge and the metering piston detached from the hydraulic piston rod.

DETAILED DESCRIPTION OF PREFERRED EMBODIMENTS

Figure 1:
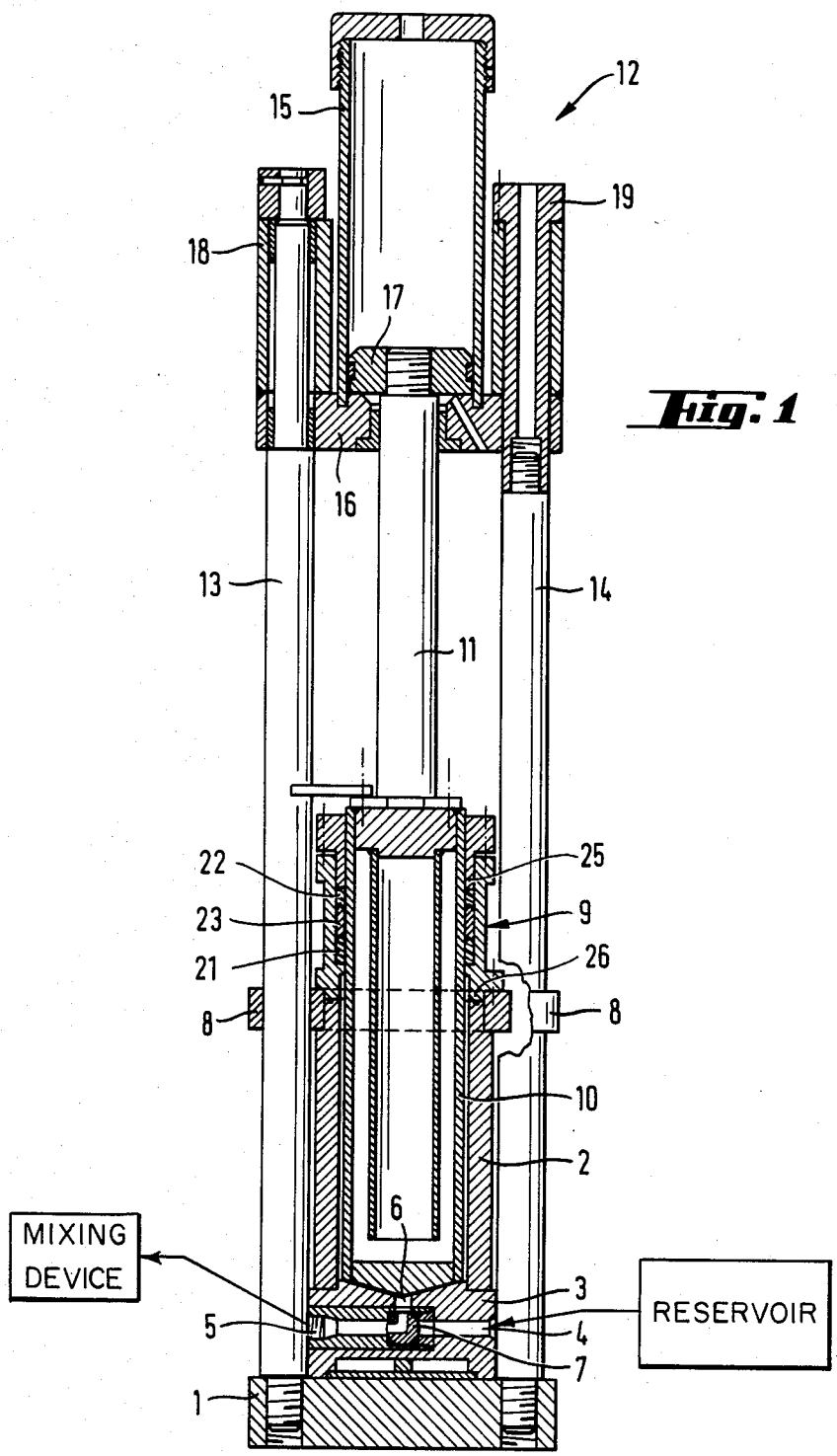
FIG. 1 shows a cross-section of a piston metering apparatus with a hydraulic drive unit and a metering cylinder with a metering piston in its lower dead center position.

A preferred embodiment of the piston metering apparatus according to the invention comprises a base plate 1 upon which a metering cylinder 2 and a cylinder bottom 3 are mounted. The cylinder base 3 contains a component inlet line 4 for connection with a component reservoir (not shown), a component outlet line 5 leading to a mixer head (not shown) and a connecting line 6 leading to the cylindrical area in the metering cylinder 2. A forced actuating reversing valve 7 is located at the intersecting area of these three lines 4, 5, and 6. The underside of the cylinder base comprises a cavity for heating the metering cylinder 2. The upper edge of the metering cylinder 2 terminates in a flange ring 8, to which a sealing cartridge 9 (FIG. 5) is fastened. The metering cylinder 2 and the sealing cartridge 9 surround a metering piston 10 in the form of an immersion or plunger piston.

The metering piston 10 is releasably fastened to a hydraulic piston rod 11 of a hydraulic drive unit 12 which is supported by two tie rods 13 and 14 anchored in the base plate 1. The flange ring 8, upwardly bounding the metering cylinder 2, is transfixed by tie rods 13 and 14. The hydraulic drive unit 12 consists of a hydraulic cylinder 15 which is closed at the bottom by a base plate 16, and to which the tie rods 13 and 14 are fastened.

The hydraulic piston rod 11, which is attached to the metering piston 10 at one end and to a double-acting hydraulic piston 17 on the other, passes through the bottom plate 16. The tie rod 13 is fastened to the base plate 16 by means of a pivot bearing 18 and the tie rod 14 by means of a screw connection 19 to the bottom plate 16.

Figure 5:
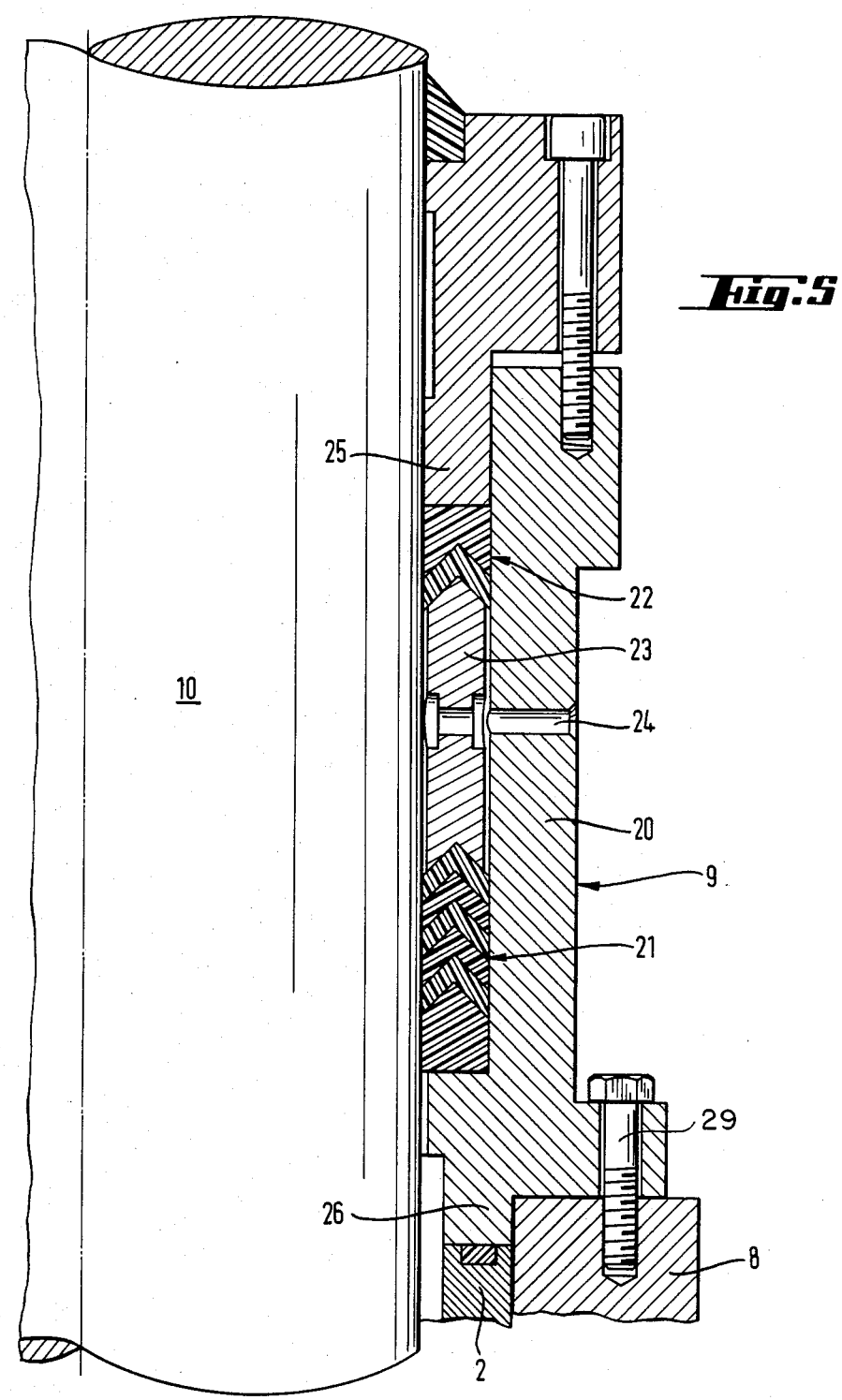
FIG. 5 shows a section through the sealing cartridge according to FIG. 1, enlarged.

FIG. 5 shows a sealing cartridge 9 comprising a cartridge housing 20, in which a lower and an upper sealing pack 21 and 22 are arranged. The sealing packs are separated by a spacer 23, which forms an annular space for taking up flushing and/or sealing media through the inlet orifices 24 provided in the cassette housing 20. A guide ring 25, with a plunger piston guide surface, is arranged in the upper end of the cartridge housing 20. This guide ring also serves as a tightening ring for use to accommodate seal wear. The cartridge housing 20 has another plunger piston guide surface and a cartridge flange 26 in its lower end. Sealing cartridge 9 is screwed onto the flange ring 8 by screw connection 29 and tightly seals the metering cylinder 2.

The process of replacing the sealing cartridge 9 requires only a few manual operations and may be effected rapidly. The previously required disassembly of the hydraulic drive unit is unnecessary.

To replace the sealing cartridge 9 or to open the cylinder space of the metering cylinder 2 for inspection or maintenance purposes, the screw connection 29 of the cartridge flange 26 is first released, then the metering piston 10 is moved upwards together with the hydraulic drive unit 12. Two spacer pieces 27 (shown in dash-and-dot lines in FIG. 2) are inserted between the cartridge flange 26 and the flange ring 8 and the metering piston 10 is again moved down. Subsequently, the connection between the hydraulic piston rod 11 and the metering piston 10 is released and the hydraulic piston rod 11 again moved up (FIG. 3). The sealing cartridge 9 is released as a single piece and may be removed laterally. Similarly, the metering piston 10 may be pulled out of the metering cylinder 2, whereby the cylinder space of the metering cylinder 2 is made readily accessible.

The sealing cartridge 9 and the metering piston 10 may thus be dismantled, inspected, and maintained in the shortest possible period of time. These parts are easily repaired or replaced. In any case, the piston metering apparatus may be restored to an operating condition in a short time with little effort and assembly.

Figure 4:
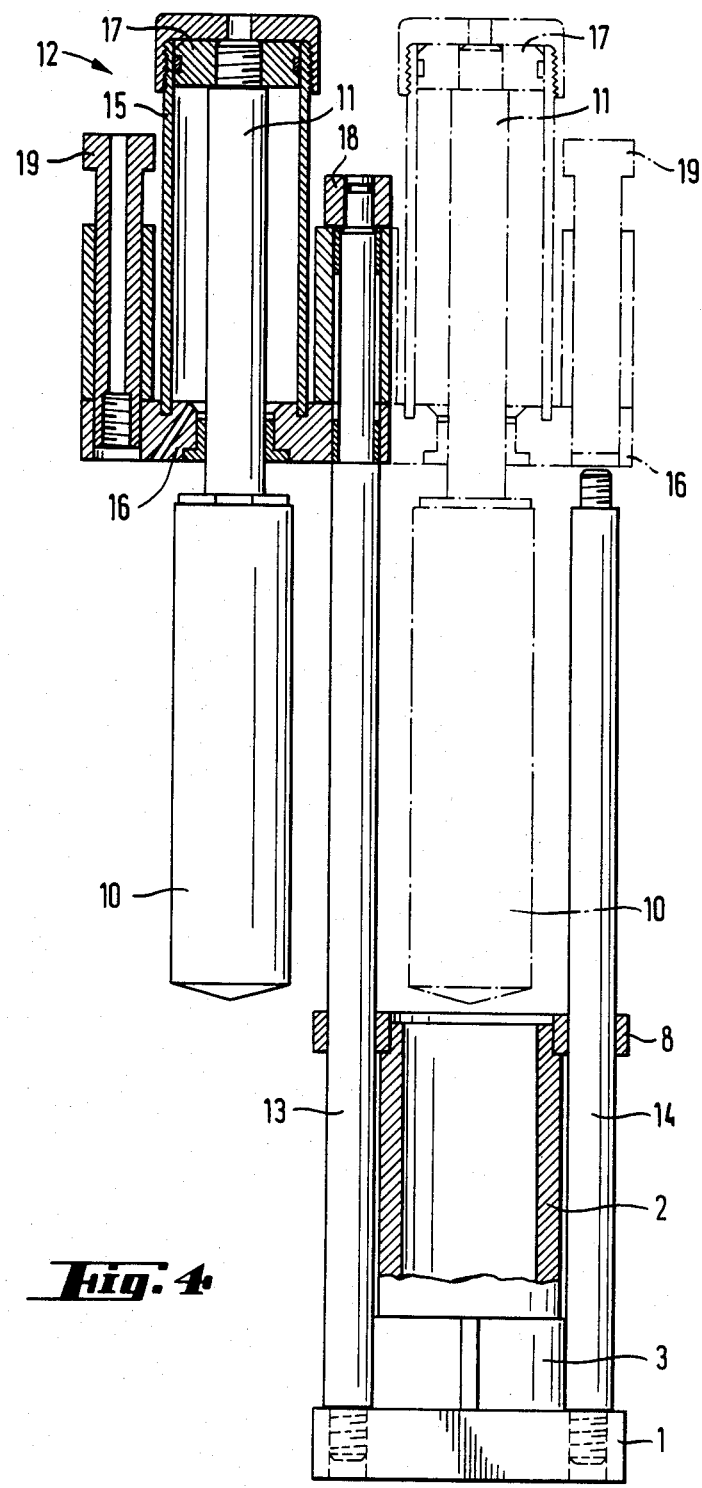
FIG. 4 shows a piston metering apparatus with the sealing cartridge removed and with a metering piston pivotable away from the hydraulic drive unit.

In order to improve the accessibility of the cylinder space, the hydraulic drive unit may be pivoted away. To do this, it is merely necessary to loosen the screw connection 19 of the tie rod 14 on the bottom plate 16, whereupon the entire hydraulic drive unit 12, and, if desired, with the sealing cartridge 9 and the metering piston 10, as well, may be swivelled away, about the pivot bearing 18. In FIG. 4, the drive unit 12 is shown by dash-and-dot lines together with the metering piston, with the screw connection already loosened. The solid lines show the drive unit 12 and the metering piston 10 in the pivoted state. The cylinder space of the metering cylinder is thereby rendered especially well accessible, which is of particular advantage if the cavity for components has to be cleaned to remove components that have, for example, reacted as the result of aging or excessive temperatures. In this event the material adhering to the internal walls may only be removed by the use of tools. A further advantage may be seen in that the pivotable hydraulic drive unit 12 may be used in the manner of an assembly crane. In view of the possibility of separating the hydraulic piston rod 11 from the metering piston 10, only smaller and lighter parts are involved in the replacement process. They may be mounted without the use of a crane. Due to the fact that the parts to be replaced may be removed laterally, there is no need to provide free space above the piston metering apparatus for dismantling with a crane. Such a space is required in the known piston metering devices. In known devices, the metering piston, the hydraulic piston rod and the hydraulic piston may be removed from the unit comprising the metering cylinder and the hydraulic cylinder as a single heavy unit only with the use of an assembly crane.

Figure 6:
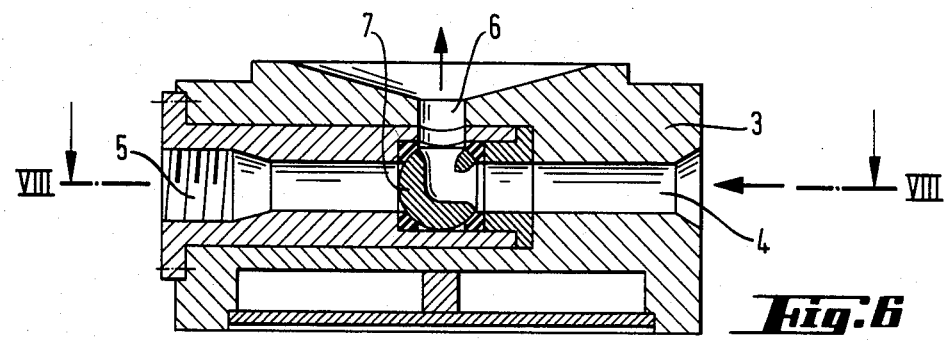
FIG. 6 shows the cylinder base of a piston metering apparatus according to FIG. 1, enlarged, with the reversing valve in a position connecting the cylinder space with the component inlet line.
Figure 7:
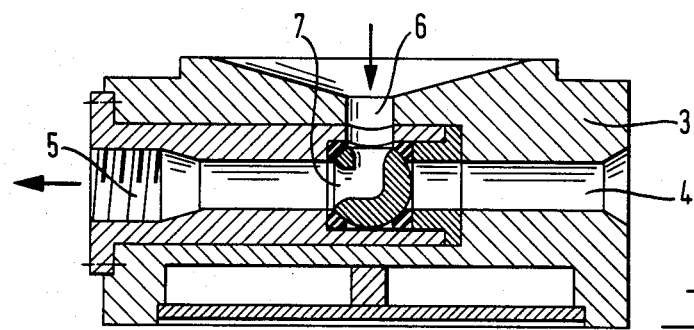
FIG. 7 shows the cylinder base according to FIG. 6 with the reversing valve in a position connecting the cylinder space with the component outlet line and FIG. 8 shows the cylinder bottom according to the section line VIII—VIII in FIG. 6.

FIG. 6 shows the cylinder base 3, where the reversing valve 7 is in the position connecting the reservoir with the metering cylinder. FIG. 7 shows the cylinder base where the reversing valve 7 is in a position connecting the metering cylinder with the mixer head.

Figure 8:
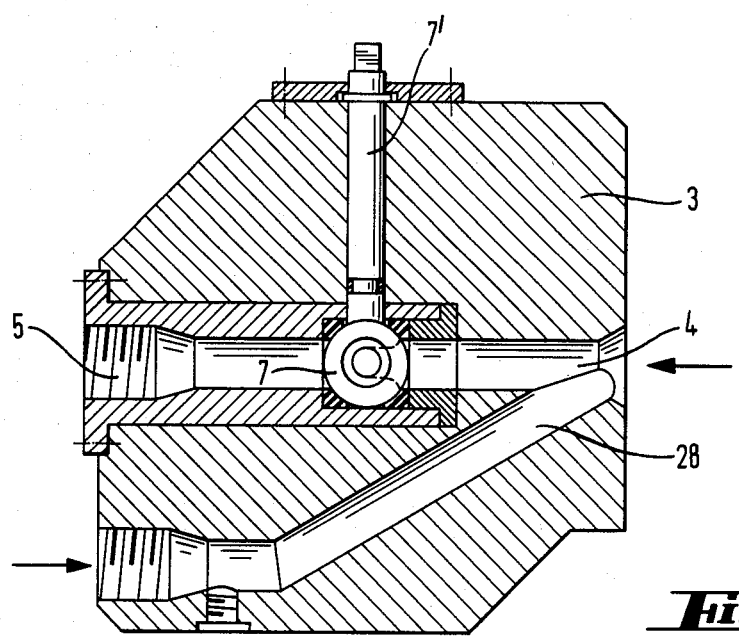

FIG. 8 shows the drive shaft 7' of the reversing valve 7 and the component return line 28 opening from the mixer head into the component inlet line 4.

What is claimed is:

1. A piston metering apparatus for use with a reaction injection molding machine comprising:
    a metering chamber having walls defining an open chamber area and a base defining the floor of said open chamber area;
    a movable metering piston in the form of a plunger piston positioned within said open chamber area during operation of said reaction injection molding machine;
    a sealing cartridge releasably attached to said chamber walls for sealing said movable metering piston at said walls exhibiting a plurality of sealing packs;
    means in the sealing cartridge for adjusting the tightness of the sealing packs and for guiding the movable metering piston in said metering chamber; and
    means for movement of said metering piston, said means including a piston rod releasably attached to said metering piston and a hydraulic drive unit.

2. The piston metering apparatus of claim 1, wherein said adjusting and guiding means comprises a ring attached to said sealing cartridge through at least one adjustment screw.

3. The piston metering apparatus according to claim 1, wherein said sealing cartridge further comprises at least one inlet orifice for admitting fluid media to the sealing packs.

4. The piston metering apparatus according to claim 3, wherein said fluid media is selected from the group consisting of sealing media and flushing media.

5. The piston metering apparatus according to claim 1, further comprising:
    a plurality of tie rods connecting said hydraulic drive unit with said base, a pivot bearing for connecting one of the tie rods to the hydraulic drive unit, a releasable screw connection for connecting each of the remaining tie rods to the hydraulic drive unit.

6. The piston metering apparatus according to claim 5, wherein two tie rods are provided.

7. The piston metering apparatus according to claim 1, further comprising means in said base for the introduction and expulsion of components into and out of said chamber area.

8. The piston metering apparatus according to claim 7, wherein said inlet and outlet means comprise an inlet conduit, an outlet conduit joined by a reversing valve in said base and a connecting conduit connecting said reversing valve with said chamber area.

9. The piston metering apparatus according to claim 8, further comprising:
    a component inlet line leading from a component reservoir of said reaction injection molding machine to said inlet conduit and,
    a component outlet line leading to a mixing head of said reaction injection molding machine from said outlet conduit.

10. The piston metering apparatus according to claim 9, wherein said base comprises a footing member, a conduit housing member and a cylinder flooring member.

11. The piston metering apparatus according to claim 10, further comprising a means for controlling the temperature in said conduit housing member.

12. The piston metering apparatus according to claim 11, wherein said temperature controlling means comprises a heating unit for maintaining said conduits and said reversing valve at an elevated temperature.

13. The piston metering apparatus according to claim 10, wherein said tie rods connect said hydraulic drive with said footing member.

14. The piston metering apparatus according to claim 8, further comprising:
    a component recirculation line which leads from a mixing head of said reaction injection molding machine to said base, and which feeds into said inlet conduit in the vicinity of said reversing valve at an acute angle against the direction flow in said inlet conduit.

15. The piston metering apparatus according to claim 7, wherein said components comprise synthetic resin materials and fillers for synthetic resin materials.

* * * * *